(12) United States Patent
Brun et al.

(10) Patent No.: US 7,502,323 B2
(45) Date of Patent: Mar. 10, 2009

(54) ACCESS CONTROL SYSTEM FOR AUTOMATION EQUIPMENT

(75) Inventors: Jean-Michel Brun, St. Etienne de Crossey (FR); Thierry Chiche, Saint Ismier (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 1084 days.

(21) Appl. No.: 10/855,650

(22) Filed: May 28, 2004

(65) Prior Publication Data

US 2007/0112961 A1 May 17, 2007

Related U.S. Application Data

(60) Provisional application No. 60/473,465, filed on May 28, 2003.

(51) Int. Cl.
*H04J 3/14* (2006.01)
(52) U.S. Cl. .................. 370/235; 709/218; 709/219; 379/201.02; 707/10
(58) Field of Classification Search ............... 370/290, 370/235; 709/218, 219; 379/201.02; 707/10
See application file for complete search history.

(56) References Cited

U.S. PATENT DOCUMENTS

| | | | | |
|---|---|---|---|---|
| 5,526,428 | A * | 6/1996 | Arnold ................. | 713/159 |
| 6,636,894 | B1 * | 10/2003 | Short et al. ............ | 709/225 |
| 7,194,554 | B1 * | 3/2007 | Short et al. ............ | 709/246 |
| 2002/0062449 | A1 * | 5/2002 | Perna et al. ........... | 713/200 |
| 2003/0004952 | A1 | 1/2003 | Nixon et al. | |

FOREIGN PATENT DOCUMENTS

| | | |
|---|---|---|
| DE | 101 28 829 | 4/2002 |
| WO | WO 00/49471 | 8/2000 |
| WO | WO 00/70531 | 11/2000 |
| WO | WO 01/69335 | 9/2001 |
| WO | WO 01/86879 | 11/2001 |
| WO | WO 02/48809 | 6/2002 |

OTHER PUBLICATIONS

Patent Abstracts of Japan, JP 58-208861, Dec. 5, 1983.

* cited by examiner

*Primary Examiner*—Olisa Anwah
(74) *Attorney, Agent, or Firm*—Oblon, Spivak, McClelland, Maier & Neustadt, P.C.

(57) ABSTRACT

System for controlling access to automation equipments connected to a first network, from at least one client station connected to a second network. The system includes determination means of a functional profile containing a list of business functions that a user of the client station is authorized to carry out on the equipment, analysing means of a frame sent on the second network by the user, in order to determine a request and a destination equipment, definition means of a filter profile for the destination equipment, containing, for each business function and for each protocol, a list of requests that the destination equipment is capable of receiving, and filter means capable of authorizing or prohibiting transmission of the sent frame on the first network, according to the frame, the functional profile of the identified user and the filter profile of the destination equipment.

19 Claims, 2 Drawing Sheets

ACCESS CONTROL SYSTEM FOR AUTOMATION EQUIPMENT

CROSS REFERENCE TO RELATED APPLICATIONS

This application claims priority under 35 U.S.C. §119(e) to Provisional Application Ser. No. 60/473,465, filed May 28, 2003 and under 35 U.S.C. § 119(a) to French Patent Application No. 03 06459, filed May 28, 2003, the entire contents of which are incorporated herein by reference.

DISCUSSION OF THE BACKGROUND

1. Field of the Invention

This invention relates to a system for controlling access to one or several automation equipments connected to a first communication network, from a client station connected to a second communication network. The invention also relates to a process for controlling access to one or several automation equipments.

2. Background of the Invention

The term "automation equipment" denotes, but is not limited to, any equipment for controlling, checking and/or monitoring any or all of an automation application particularly belonging to the field of industrial process automation, building automation, tertiary automation or monitoring/control automation for electrical distribution networks. Therefore, this term includes for instance a programmable logic controller (PLC) and a numerical control (NC), and also any unit or module that can be connected to a local or global communication network. Thus, this definition can include an industry specific module or remote inputs/outputs module, an operator dialogue terminal, a supervision station, a building technical management system (GTB), a variable speed controller, etc. In the field of electrical distribution, automation equipment also refers to a monitoring/control station, a measurement control unit, a protection and control relay, a circuit breaker/smart contactor, etc.

Distributed architectures are now quite routine in automation and therefore it is very frequent for different automation equipments to be connected together through a first communication network to form an installation, sometimes called an automation cell. For example, such a network could be based on Ethernet, and it could comply with the TCP/IP standard or the UDP/IP standard, but it could also be based on LANs such as MODBUS, FIP, CANOpen, CAN, LON, Uni-telway, etc.

Automation equipment more and more frequently integrates a WEB server so that it is easy to exchange data relating to them with any type of remote WEB client such as a navigator installed on a client station connected to the same first network or to a second communication network, particularly an Intranet, Extranet or Internet type global network. These functions are described in particular in documents WO9913418, U.S. Pat. Nos. 6,061,603 and 5,805,442. Data related to the automation equipment are then formatted and sent by the WEB server, for example in the form of HTML or XML pages, or are presented by specific applets.

This openness to communication standards enables easy access from any point of a global network to a resource connected to this network or to an interconnected LAN. However, automation equipment normally executes a program to control, monitor and/or check all or some of an industrial process automation, building automation or electrical distribution instrumentation/control application, in real time. Security, availability, confidentiality and reliability are therefore essential criteria for smooth operation of the application. Therefore, it is important to be able to have safe protection of automation equipment connected to a communication network to prevent illicit or unauthorized accesses from an external network.

Several serious risks could occur, such as the introduction of different forms of viruses, deliberate or accidental saturation of the local network hindering communication between equipment, illegal reading/or modification of programs, data and parameters on which operation of the application depends, etc.

"Firewall" computer systems already exist to prevent these risks, and protect equipment connected to a first network by filtering the frames sent from a second external network. These systems mainly use computer security criteria based particularly on IP addresses of the sender and the receiver, on port numbers used on the server side and the client side, on login procedures and passwords and on information encryption, etc. Typically, these firewall type or proxy type systems make computer applications connected to Internet secure by doing a Pass/Nopass type filtering, in other words they simply prevent or allow a TCP/IP network service such as the Web HTTP protocol to pass.

SUMMARY OF THE INVENTION

None of the firewall computer systems can provide efficient protection against access to a business function exposed by a target automation equipment, while only allowing the frames carrying a command and sent by an identified user with the necessary rights for execution of this command by the target equipment and while guaranteeing that any frame that does not satisfy these criteria will be systematically rejected. One way to implement optimum protection and facilitate configuration and maintenance operations is to take account of filtering criteria based on the concept of a business functional profile like that described below. As such, these configuration and maintenance operations can then be carried out by persons other than network and security specialists.

In general, there are several authorization levels making it possible to access automation equipment corresponding to different business functions. These business functions are authorized or prohibited depending on the profile of the user who wants to execute them. For example, a maintenance agent in an installation may be authorized to read some data supplied by installation equipment without being authorized to write these data. A machine adjustment operator may be authorized to read and write some parameters but only on automation equipment connected to his machine. However, a designer can access functions for modification of the application program for one or several equipments, downloading programs, downloading firmware.

Therefore, several different access levels may be assigned according to:

the profile of the identified user (for example Maintenance agent, Supervisor, Debugging technician, Design engineer, etc.), the equipment that the identified user wants to access, and the business function (for example in other words Monitoring, Adjustment, Instrumentation/control, Programming, etc.) that this user is likely to carry out.

The result is a functional profile specific to a user or a users group and that defines a list of business functions that this user or this group of users may be authorized to carry out on a specific equipment on the installation.

For each given business function, there is actually a set of particular network requests for each type of equipment, these requests possibly being different depending on the communication protocol used. Therefore, it is appropriate to make an association firstly between a business function on a given type of automation equipment, and secondly the corresponding network request(s) in each communication protocol, so that this business function can be carried out on this type of automation equipment. The result obtained is thus an equipment type filter profile that contains all allowable requests in different protocols to carry out the different business functions supported by this type of equipment.

Therefore, it would be interesting to have a control access system capable of automatically filtering frames sent on a first communication network to one or several automation equipments through a second network, from such an approach based on functional modelling of communication flows, rather than using a purely computer and network approach that would be unable to make a distinction between different functional profiles, for example using the same network protocol.

Starting from the functional profile of the user and the filter profile of the destination automation equipment, the system will then be capable of filtering any frame being sent to automation equipment connected to the second network, using these functional criteria to guarantee that only authorized frames will be transmitted to the destination equipment.

To achieve this, the invention describes an access control system to one or several automation equipments connected to a first communication network from at least one client station connected to a second communication network. The system includes means of identification of at least one user of the client station, means of determination of a functional profile containing a list of business functions that the identified user is authorized to carry out on the equipment, means of analysing the content of a frame sent on the second network by the identified user, in order to determine a request in the said frame together with a destination automation equipment, means of defining a filter profile for the destination equipment, containing a list of requests that the destination equipment is capable of receiving, and filter means for authorizing or prohibiting transmission of the sent frame on the first network for each business function according to the content of said sent frame, the functional profile of the identified user and the filter profile of the destination equipment.

According to one characteristic, the system uses functional profile libraries and filter profile libraries, these profiles being accessible to the system and described in files in the XML language, to make them easily understandable.

According to another characteristic, the system is installed in computer device connected to the first and the second network.

The invention also describes a process for controlling access to one or several automation equipments used in such a system.

With the invention, an installation administrator can easily set up filter rules to increase security of access to automation equipment connected to the second network without any particular knowledge of computer networks or network security techniques or of technical choices about the implementation of business functions in the equipment. Rather, the filter setup can be based on functional criteria much closer to the automation business, such as the user's business/associated functional profile (accessible business functions)/target equipment type/target equipment filter profile (authorized requests). Operation, maintenance and upgrades to such a system will then be simplified, since the invention can be used without it being necessary to make any modifications to automation equipment in the installation. Moreover, the system can support a large number of different communication protocols that may or may not be based on Ethernet/IP, particularly protocols possessing an automation oriented application layer (layer 7 of the OSI model), for example of the MODBUS type (for example MODBUS on TCP/IP, MODBUS on serial link, MODBUS on CAN network).

BRIEF DESCRIPTION OF THE DRAWINGS

Other characteristics and advantages will become clear in the detailed description given below related to an embodiment given as an example and represented by the appended drawings in which.

DETAILED DESCRIPTION OF THE PREFERRED EMBODIMENTS

Figure 1:
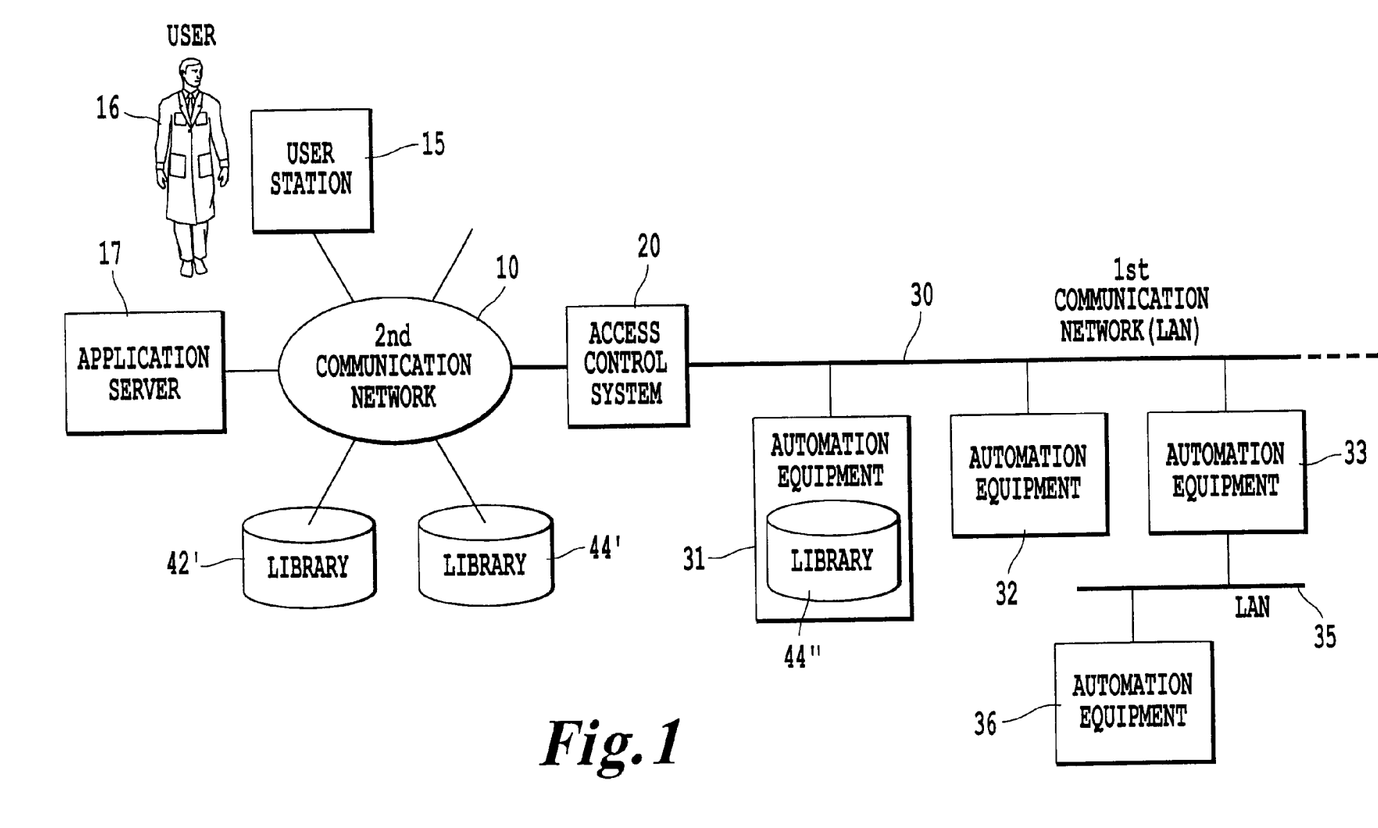
FIG. 1 shows an example architecture comprising an access control system according to the invention.

Referring now to the drawings, wherein like reference numerals designate identical, or corresponding parts throughout the several views, and more particularly to FIG. 1, the architecture in FIG. 1 shows an installation composed of several automation equipments 31,32,33 connected to a first communication network 30. In the example in FIG. 1, this first communication network 30 may be a local automation network. For example, the communication network 30 may be based on Ethernet at the OSI link layer 2 and comply with the TCP/IP standard and the UDP/IP standard, in other words an IP network. The LAN 30 may also include an OSI application layer 7 conforming to a MODBUS, UNI-TE type automation protocol, etc.

Automation equipment connected to the first network 30 may thus need to exchange information on a second communication network 10 through an access control system 20 connected both to the first network 30 and to the second communication network 10. The second network 10 is preferably a global type network such as Intranet, Extranet or Internet in accordance with the TCP/IP standard and the UDP/IP standard (IP network) or an STN, ISDN, GSM, ADSL type network, etc. Several stations can be connected to the second network 10, such as a user station 15 of the PC computer type, an application server 17 or others (production management server, maintenance management server, etc.).

Figure 2:
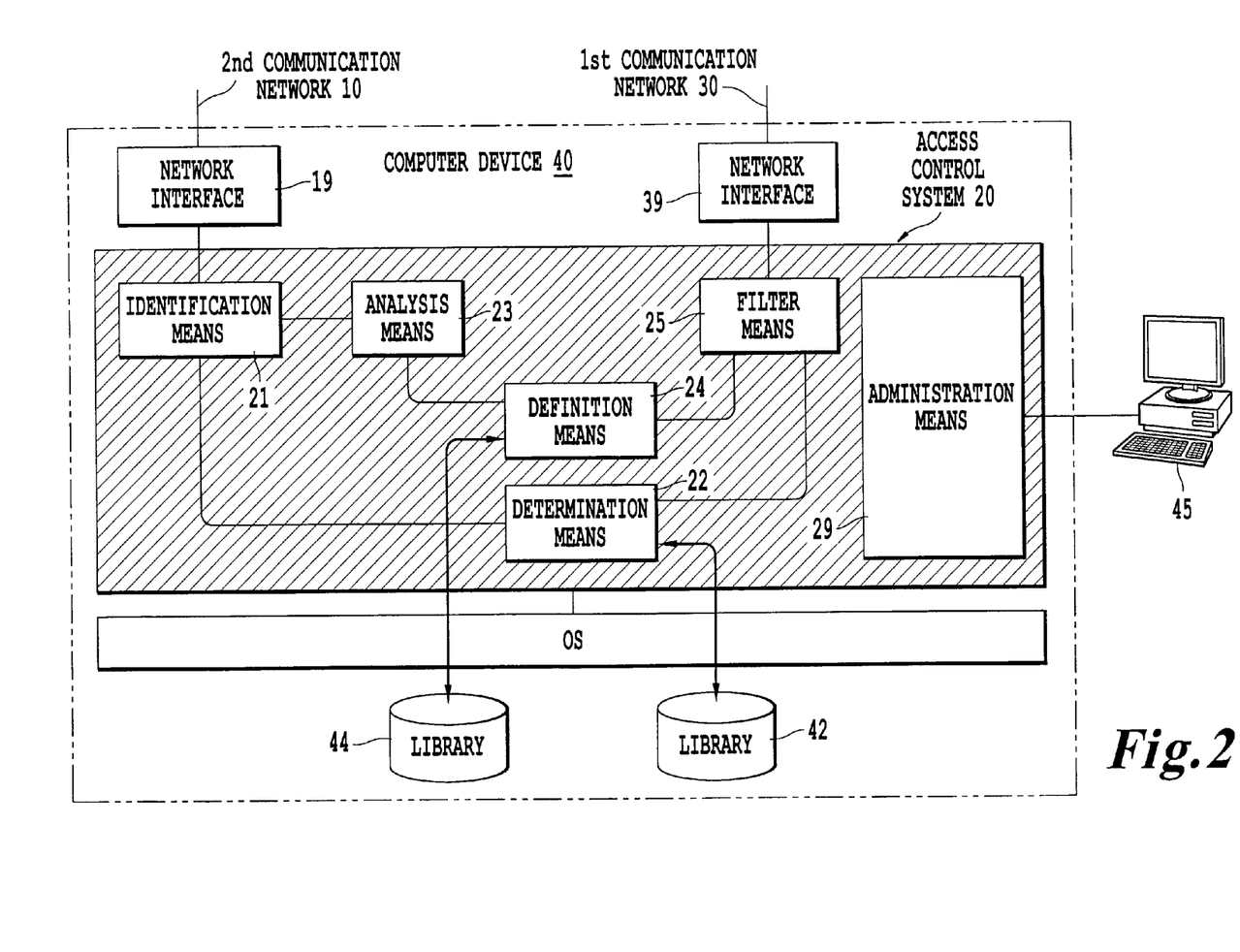
FIG. 2 shows details of different elements of a computer device integrating the access control system.

With reference to FIG. 2, the access control system 20 is implemented in a computer device 40 (for example such as a PC, modem, dedicated equipment, etc.) that includes a central unit operating under an operating system OS such as a Linux operating system. The computer device 40 is connected to the second network 10 through a network interface 19 and to the first network 30 through a network interface 39. The computer device 40 performs the router or bridge functionality between the two networks 10, 30. The computer device 40 may also include a storage memory such as a hard disk, flash memory or others, in particular to save the libraries 42, 44 (see later) or information about access requests and processing (frame acceptance or rejection). The access control system 20 may be implemented either in a specific computer device 40 dedicated to this task, or in an computer device 40 that may also carry out other tasks, but that is provided with sufficient resources to execute the access control system 20.

The access control system 20 filters frames sent by a user 16 on the second network 10, in order to exchange information with one or several automation equipments 31,32,33 directly or indirectly connected to the first network 30. The user 16 works from any client station 15 connected to the second network 10, using a standard client software such as a WEB browser, or a supervision software, programming software or debugging software for automation equipment, or any other dedicated software.

According to the invention, the system 20 firstly includes identification means 21 enabling identification of at least one user 16 of a client station 15. The user 16 may be identified by a classical login/logout method using a user name and a password, or using an electronic certificate. If the second network 10 is an IP (Internet Protocol) network, a session security communication protocol of the SSL (Secure Socket Layer) type standardised by the IETF (Internet Engineering Task Force) is used in preference, so as to improve the confidentiality and integrity of information exchanged during the authentication phase. It is also possible to use security services proposed by IPSec to encapsulate the frames exchanged.

Identification means 21 verify that the received information (Name+Password or information contained in the electronic certificate) is consistent with a list of authenticated users recorded in advance, to validate identification of a user 16. This list of authenticated users is accessible to the system 20 either because it is stored in the storage memory of the computer device 40, or because it is stored in an external server connected to the second network 10 through a URL, URI or IP address, or for example on an LDAP server.

The system 20 includes determination means 22 for determining a functional profile of the identified user 16. The functional profile of a user includes the list of business functions that this user is authorized to carry out on the different automation equipment connected to the first network 30.

Several business functions can be envisaged:
the "Monitoring" function that reads data specific to the equipment or the process managed by the equipment,
the "Instrumentation/control" function that reads and writes data related to the equipment or the process managed by the equipment, and
the "Programming" function that defines parameters or displays and modifies the equipment application program.

Other additional business functions issuing other distinct rights may easily be defined within the context of the invention, depending on the needs of a specific installation. Thus, the "Motor adjustment" function could be created to read and write some adjustment parameters only corresponding to a memory area identified in a given type of automation equipment (e.g., particularly in speed controllers).

In the functional profile of a given user 16, each automation equipment 31,32,33 may be associated with none, one or several distinct business functions. For example, a user 16 may be authorized to perform the Monitoring function on the equipment 31, the Programming function on the equipment 32, and no functions on equipment 33. Similarly, a user may be authorized to perform several different business functions on the same equipment.

The determination means 22 select the functional profile of the identified user 16 from one or several libraries 42,42' containing functional profiles of the set of registered users. The library(ies) 42,42' is(are) accessible to the system 20 either by being directly stored in the storage memory of the computer device 40 (see for example FIG. 2, library 42), or for example are accessible through a URL, URI or IP address, in an external server connected to the second network 10 (see for example FIG. 1, library 42') or the first network 30.

The invention also allows for the possibility of defining a functional profile for a users group rather than for a particular user. To simplify implementation and administration of the access control system 20, the concept of a users group can be introduced in which a single functional profile is defined for all users in the group. For example, an "Operators" group would be able to access the Monitoring function for all or some of the equipment 31,32,33, a "Design engineers" group would have access to the Programming function for programmable logic controller type equipment only, a "Supervisors" group would have access to the equipment instrumentation/control function, etc. In this case, an identified user 16 is then defined as belonging to a users group, which automatically gives user 16 a given functional profile. Similarly, the invention includes the possibility of associating a given user functional profile with a group of equipment rather than particular equipment.

The system 20 includes analysis means 23 for analysing the content of frames sent on the second network 10. In particular, the analysis means 23 make it possible to recognize a destination equipment Dt in a sent frame "t". If the second network 10 and the first network 30 are IP networks, then the destination equipment Dt may be identified in the frame t using its IP address. When the destination equipment Dt is actually one of the equipments 31,32,33, the analysis means 23 will then associate a given type of equipment with this destination equipment Dt. An equipment type represents a family of automation equipment with common characteristics in terms of its communication exchanges (for example a speed controller type, a programmable logic controller network module type, a protection relay type, etc.). Affiliation of automation equipment 31,32,33 to a given equipment type is configured by system 20.

The analysis means 23 are also capable of identifying the communication protocol Pt and the request Rt used in the frame t. If the second network 10 and the first network 30 are IP networks, the protocol Pt is then determined by the number of the TCP/UDP port (for example port 80 for the HTTP protocol, ports 20,21 for the FTP protocol, port 502 for the MODBUS protocol, etc.). In the example of the MODBUS protocol, the analysis means 23 firstly identify the port 502, and then analyse the content of the frame t at the OSI level 7 to identify the request Rt associated with this frame t.

This analysis of the frame t at application level (OSI layer 7) makes it possible to distinguish the request type Rt within the automation protocol (MODBUS, CANOpen, . . . ) or the computer protocol (HTTP, FTP, SNMP, . . . ) so that this request can be prohibited or authorized depending on the user associated functional profile. In the example of a Monitoring type business function associated with equipment supporting the MODBUS and FTP protocols, the invention is thus capable of prohibiting MODBUS write requests (i.e., modification of data in the equipment) and FTP write requests (i.e., writing a parameters file on the equipment through FTP), but it does authorize MODBUS read requests and FTP read requests necessary for the Monitoring business function of the equipment.

This analysis granularity enables the invention to filter the communication protocol even more finely, and particularly in the case of the MODBUS protocol, to analyse data address ranges for the equipment concerned by read or write requests; the invention can then authorize or prohibit a MODBUS read or write only on some specific data of the equipment.

Many communication protocols, and particularly WEB protocols (HTTP, FTP, SNMP, SMTP) or automation-oriented protocols (MODBUS, UNI-TE, CAN, CANOpen or others) could be envisaged for the purpose of the invention.

The system 20 includes definition means 24 for defining a filter profile for the destination equipment Dt that was identified in the frame t by the analysis means 23. The filter profile of automation equipment contains the list of requests that can be received for this type of equipment, as indicated in the example in Table 1 given below for each business function and for each communication protocol. It frequently happens that the different requests based on different protocols can be used to execute the same business function on a target equipment (for example, a parameter for the target equipment can be modified by sending a MODBUS, HTTP or SNMP request).

When a user 16 wants to perform a business function on a given type of equipment from a client station 15, this is done by sending one or several requests (for example requests such as READ INPUT STATUS, READ OUTPUT STATUS, WRITE SINGLE REGISTER type, etc. . . . ) based on one or several protocols that can be executed by this type of equipment. Consequently, to control access to automation equipment, the system 20 can recognize a request Rt sent in a frame t and verify that this request Rt actually corresponds to an authorized business function implemented by the equipment.

Therefore, there are one or several libraries 44,44',44" containing filter profiles for different types of automation equipment that are used to define the list of authorized requests for each type of equipment corresponding to each business function. This list of requests belongs to one or several communication protocols. The library(ies) 44,44',44" is (are) accessible by the system 20, either because the libraries are stored in the storage memory of the computer device 40 (see FIG. 2, library 44), or because the libraries are stored for example using an URL, URI or IP address in an external server accessible to the system 20 through the second network 10 (see FIG. 1, library 44'), or the libraries are stored directly in a destination equipment Dt itself (see FIG. 1, library 44") accessible to the system 20 through the first network 30.

Thus, once the analysis means 23 have identified the type of the destination automation equipment Dt of the frame t, the definition means 24 define the filter profile corresponding to this type of destination automation equipment Dt.

Preferably, the functional profiles and the filter profiles are described in files in the XML language, which makes them compatible with WEB standards and easily modifiable from an XML editor. Table 1 shows a simplified example of the filter profile for the "MONITORING" business function ("SecurityProfile"), for an automation equipment type "TSX_ ETY510" ("DeviceType") and for MODBUS and FTP communication protocols ("Protocol Name"). In Table 1, the MODBUS protocol corresponds to port number 502 ("Function IPPort") and the request codes ("FunctionCode") authorized for the "MONITORING" business function are the "08" and "7E" codes. For the FTP protocol, all request codes (in fact denoted by the "*" sign) corresponding to port No. 20 are authorized to perform the "MONITORING" business function on automation equipment type "TSX_ ETY510". However, only request codes "0", "1", "3" and "6" are authorized for port No. 21 to perform the "MONITORING" business function on equipment type "TSX_ETY510".

Table 1 also shows an additional level in the analysis of some requests, since the request code "08" of the MODBUS protocol is only authorized in association with the codes of sub-requests "01" and "02" ("SubFunction subcode"), which means that the analysis means 23 are capable of determining the request and the sub-request contained in a frame t if necessary. This optional function provided in the invention makes it possible to target filter profiles of the control system 20 even better and therefore filter frames transmitted on the second network 10 more precisely.

TABLE 1

```
<SecurityProfileGroup Name="Monitoring">
    <DeviceType="TSX_ETY510">
        <Protocol Name="Modbus">
            <Function IPPort="502">
                <FunctionCode Name="Diagnostic" Code="08">
                    <SubFunction subcode="01" Name="Read Diag"/>
                    <SubFunction subcode="02" Name="Write Diag"/>
                </FunctionCode>
                <FunctionCode Name="Diagnostic" Code="7E"/>
            </Function>
        </Protocol>
        <Protocol Name="FTP">
            <Function IPPort="20">
                <FunctionCode Name="all" Code="*"/>
            </Function>
            <Function IPPort="21">
                <FunctionCode Name="USER" Code="0"/>
                <FunctionCode Name="PASS" Code="1"/>
                <FunctionCode Name="TYPE" Code="3"/>
                <FunctionCode Name="CWD" Code="6"/>
            </Function>
        </Protocol>
    </DeviceType>
</SecurityProfileGroup Name>
```

Finally, the system 20 includes filter means 25 that are capable of prohibiting or authorizing transmission on the first network 30 of the frame t sent from the second network 10. To achieve this, the filter means 25 use the functional profile of the identified user 16 and the filter profile of the destination automation equipment Dt. The filter means 25 verify that the frame t actually contains a request Rt that is listed in the filter profile of the destination equipment Dt and that this request Rt actually corresponds to a business function authorized in the functional profile of the identified user 16. If this is the case, the frame t is transmitted to the destination equipment Dt normally through the interface 39. Otherwise, the frame t is not transmitted. Thus, the system 20 is capable of controlling access to any automation equipment connected to the first network 30 from functional criteria.

It is possible to increase access security to automation equipment without it being necessary to keep an unused session opened. For that purpose, the filter means 25 are capable of measuring an inactivity time Ti specific to each identified user 16. This time Ti is initialized to a zero value at the time that the user 16 is identified, and every time that the system 20 receives an authorized frame t from this user 16 to one of the automation equipment 31,32,33. If the inactivity time Ti remains below a maximum inactivity time Tmax, operation of the system 20 remains unchanged. If the inactivity time Ti becomes greater than Tmax, then exchanges between the user 16 and one of the equipments are prohibited. The user 16 then identifies himself again (Login) before he can restart exchanges. The maximum inactivity time Tmax may be fixed by configuration, either individually for a user or for a users group or for a business function.

According to one variant presented in FIG. 1, the installation includes an additional LAN 35 to which automation equipment 36 is connected. One of the automation equipments, in this case equipment 33, is then simultaneously connected to networks 30 and 35. In this case, equipment 33 therefore acts as a gateway between the first network 30 and the additional LAN 35 (e.g., a programmable logic controller type equipment can perform this function).

If the additional LAN 35 is an IP network, then the automation equipment 36 may be identified by its IP address or its MAC address, and may be integrated into operation of the system 20 in the same way as the equipment 31,32,33. If the additional network 35 is not an IP network, but for example is a master/slave type of field bus in which the equipment 33 is the master, then when the system 20 identifies a frame t for which the destination is the IP address of the equipment 33, the analysis means 23 should identify not only the Rt request in the frame t, but also the destination slave of the request Rt before the analysis means 23 can authorize or prohibit transmission of the frame.

Moreover, the system 20 advantageously includes administration means 29 that enable an administrator to configure the system 20, for example from a man/machine interface 45 connected to the computer device 40. It would also be possible for the administration means 29 to be implemented in another computer machine in an equivalent manner, and for the configuration of the system 20 to be made through the second network 10 through a WEB interface secured by HTTPS.

The administrator can configure the entire system 20. In particular, at any time the administrator can modify/add/delete users on line, functional user profiles, filter profiles, business functions, automation equipment types, communication protocols supported by the system 20, etc. With this invention, the administrator can thus set up precise and customized access control for automation equipment of an installation, without any special skills in computer technologies, but simply based on functional criteria related to the automation business. This simplifies the implementation and management of a "firewall" system dedicated to automation equipment connected to an open network.

It would be possible to imagine other variants and detailed improvements and even to consider the use of equivalent means, without departing from the scope of the invention.

The invention claimed is:

1. System for controlling access to one or several automation equipments connected to a first communication network, from at least one client station connected to a second communication network, comprising:
    identification means for identifying at least one user of the client station;
    determination means for determining a functional profile of the identified user containing a list of business functions that the identified user is authorized to carry out on the automation equipment;
    analysis means for analyzing a content of a frame sent on the second communication network by the identified user, in order to determine a request in said frame together and a destination automation equipment;
    definition means for defining a filter profile for the destination automation equipment, containing a list of requests that the destination automation equipment is capable of receiving, for each business function; and
    filter means for authorizing or prohibiting transmission of said sent frame on the first communication network, according to said sent frame, said functional profile of the identified user and the filter profile of the destination automation equipment,
    wherein the determination means for determining a functional profile use at least one functional profiles library accessible to the system, and
    wherein the definition means for determining a functional profile use the at least one filter profiles library accessible to the system and including a list of authorized requests belonging to one or several communication protocols, for a given automation equipment and for a given business function.

2. Access control system according to claim 1, wherein the filter profiles library comprises requests belonging to several communication protocols chosen from a list including HTTP, FTP, SNMP, MODBUS, UNI-TE, CANOpen, CAN, LON.

3. Access control system according to claim 1, wherein the first communication network comprises an IP network.

4. Access control system according to claim 1, wherein the second communication network comprises an IP network.

5. Access control system according to claim 4, wherein the second communication network comprises an Internet, Extranet or Internet type network.

6. Access control system according to claim 1, wherein the business functions are chosen from a list including monitoring, instrumentation and control, and programming of an automation equipment.

7. Access control system according to claim 1, wherein the functional profiles and filter profiles are described in the XML language.

8. Access control system according to claim 1, wherein the system uses a session security communication protocol of the Secure Socket Layer type.

9. Access control system according to claim 1, wherein the filter means for authorizing or prohibiting transmission measure an inactivity time specific to each identified user and prohibit transmission of a frame sent by the identified user on the first communication network, after a maximum predetermined inactivity time.

10. Access control system according to claim 1, wherein the system is installed in a computer device connected to the first communication network and the second communication network.

11. Access control system according to claim 10, wherein the computer device comprises an internal storage memory configured to save at least one functional profiles library and at least one filter profiles library.

12. Access control system according to claim 10, further comprising:
    administration means accessible from a man or machine interface connected to the computer device.

13. Access control system according to claim 1, wherein the definition means for defining a filter profile use the at least one filter profiles library accessible to the system and containing a list of authorized requests belonging to one or several communication protocols, for a given automation equipment and for a given business function.

14. Access control system according to claim 1, wherein the filter means measure an inactivity time specific to each identified user and prohibit transmission of a frame sent by the identified user on the first communication network, after a maximum predetermined inactivity time.

15. Access control system according to claim 1, wherein the system is installed in a computer device connected to the first communication network and the second communication network.

16. Access control system according to claim 15, wherein the computer device comprises: an internal storage memory configured to save the at least one functional profiles library and the at least one filter profiles library.

17. Access control system according to claim 15, further comprising:
    administration means accessible from a man or machine interface connected to the computer device.

18. Process for controlling access to one of several automation equipments connected to a first communication network, from at least one client station connected to a second communication network, comprising:

- identifying at least one user of the client station;
- determining a functional profile containing a list of business functions that the identified user is authorized to carry out on the automation equipment;
- analyzing the content of a frame sent on the second communication network by the identified user, in order to determine a request in the frame together with a destination automation equipment;
- defining a filter profile for the destination automation equipment, containing a list of requests that the destination equipment is capable of receiving, for each business function; and
- authorizing or prohibiting transmission of the said sent frame on the first communication network, according to said sent frame, said functional profile of the identified user and said filter profile of the destination equipment,
- wherein a functional profile uses at least one functional profiles library accessible to the first and second communication networks, and
- wherein the at least one filter profiles library are accessible to the first and second communication networks and include a list of authorized requests belonging to one or several communication protocols, for a given automation equipment and for a given business function.

19. System for controlling access to one or several automation equipments connected to a first communication network, from at least one client station connected to a second communication network, wherein the system comprises:

- an identification unit configured to identify at least one user of the client station;
- a determination unit configured to determine a functional profile of the identified user containing a list of business functions that the identified user is authorized to carry out on the automation equipment;
- an analysis unit configured to analyze a content of a frame sent on the second communication network by the identified user, in order to determine a request in said frame together and a destination automation equipment;
- a definition unit configured to define a filter profile for the destination automation equipment, containing a list of requests that the destination automation equipment is capable of receiving, for each business function; and
- a filter unit configured to authorize or prohibit transmission of said sent frame on the first communication network, according to said sent frame, said functional profile of the identified user and the filter profile of the destination automation equipment,
- wherein the determination unit uses at least one functional profiles library accessible to the system, and
- wherein the definition unit uses the at least one filter profiles library accessible to the system and including a list of authorized requests belonging to one or several communication protocols, for a given automation equipment and for a given business function.

* * * * *

UNITED STATES PATENT AND TRADEMARK OFFICE
CERTIFICATE OF CORRECTION

| | |
|---|---|
| PATENT NO. | : 7,502,323 B2 |
| APPLICATION NO. | : 10/855650 |
| DATED | : March 10, 2009 |
| INVENTOR(S) | : Brun et al. |

It is certified that error appears in the above-identified patent and that said Letters Patent is hereby corrected as shown below:

On the title page, Item (30), The Foreign Application Priority Data has been omitted. Item (30) should read:

Item --(30)    Foreign Application Priority Data

May 28, 2003  (JP) ........................................ 03 06459--

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,502,323 B2
APPLICATION NO.   : 10/855650
DATED             : March 10, 2009
INVENTOR(S)       : Brun et al.

It is certified that error appears in the above-identified patent and that said Letters Patent is hereby corrected as shown below:

On the title page, Item (30), The Foreign Application Priority Data has been omitted. Item (30) should read:

Item --(30)        Foreign Application Priority Data

May 28, 2003  (FR) ..................................... 03 06459--

This certificate supersedes the Certificate of Correction issued April 21, 2009.

Signed and Sealed this

Twenty-third Day of June, 2009

JOHN DOLL
*Acting Director of the United States Patent and Trademark Office*